H. S. THOMAS, W. R. DAVIES AND R. B. THOMAS.
N. C. B. THOMAS, H. R. W. ANDERSON AND C. BATHURST, EXECUTORS OF R. B. THOMAS, DEC'D.
TINNING MACHINE.
APPLICATION FILED MAY 13, 1918.

1,304,408.

Patented May 20, 1919.
2 SHEETS—SHEET 1.

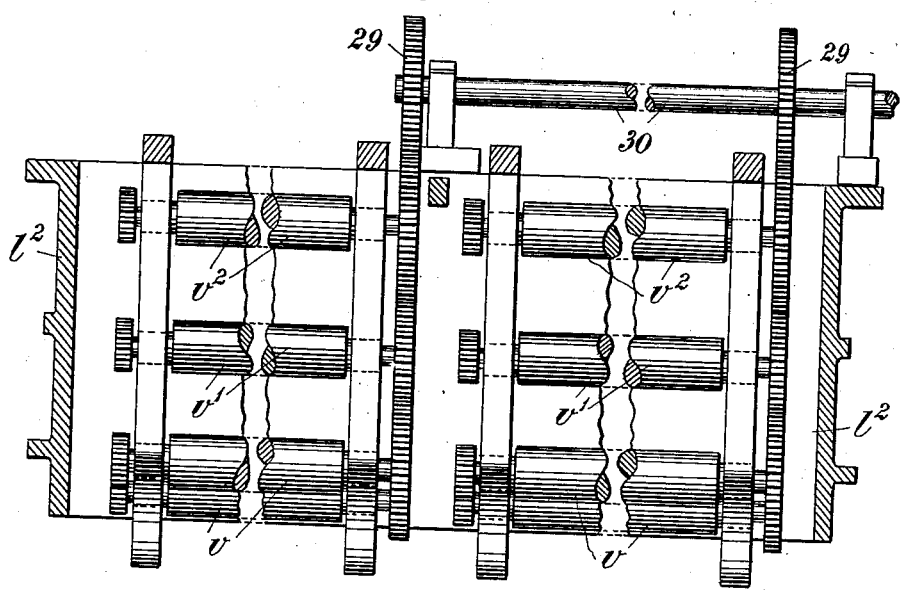
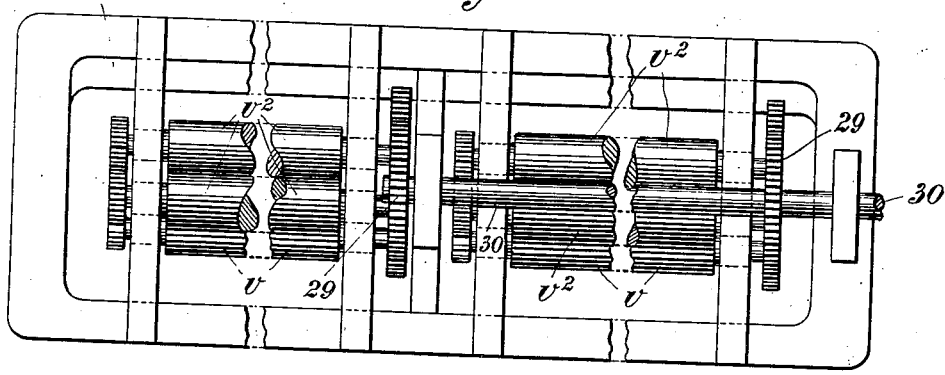

UNITED STATES PATENT OFFICE.

HUBERT SPENCE THOMAS, OF LLANDAFF, WALES, WILLIAM ROBERT DAVIES, OF WHITCHURCH, NEAR CARDIFF, WALES, AND RICHARD BEAUMONT THOMAS, DECEASED, LATE OF ENGLEFIELD GREEN, ENGLAND, BY NORA CONSTANCE BEAUMONT THOMAS, OF ENGLEFIELD GREEN, ENGLAND, HENRY ROBERT WILLIAM ANDERSON, OF LONDON, ENGLAND, AND CHARLES BATHURST, OF LYDNEY, ENGLAND, EXECUTORS OF SAID RICHARD BEAUMONT THOMAS, DECEASED.

TINNING-MACHINE.

1,304,408.  Specification of Letters Patent.  Patented May 20, 1919.

Original application filed August 6, 1917, Serial No. 184,768. Divided and this application filed May 13, 1918. Serial No. 234,302.

*To all whom it may concern:*

Be it known that we, HUBERT SPENCE THOMAS, a subject of the King of Great Britain, residing at Llandaff, Glamorganshire, Wales, and WILLIAM ROBERT DAVIES, a subject of the King of Great Britain, residing at Whitchurch, near Cardiff, Glamorganshire, Wales, and RICHARD BEAUMONT THOMAS, deceased, formerly a subject of the King of Great Britain, and lately residing at Englefield Green, Surrey, England, (NORA CONSTANCE BEAUMONT THOMAS and HENRY ROBERT WILLIAM ANDERSON and Sir CHARLES BATHURST, subjects of the King of Great Britain, residing, respectively at The Glade, Englefield Green, Surrey, England; No. 80 Redcliffe Gardens, London, England, and Lydney Park, Lydney, Gloucestershire, England, being the executors of said RICHARD BEAUMONT THOMAS,) have invented certain new and useful Improvements in Tinning-Machines, of which the following is a specification.

Our invention relates to machinery for the manufacture of tin-plates and sheets such as is described and represented in the specification of our application for Letters Patent Serial No. 184,768 filed August 6th 1917 and consists of the improvements hereinafter described in the rolls of the said machinery.

In order that our invention may be the better understood we remark that in machines of the kind referred to a series of single plates or sheets are passed side by side or abreast through the machine, the said machines having a width proper to take simultaneously a row of single plates or sheets. In the said machines as heretofore constructed the rolls have had a length equal or approximately equal to the width of the machine and consequently when one or other of the rolls break a complete stoppage of the machine results.

According to our invention we make each of the rolls in two short lengths or parts the ends of which are presented to one another at or near the middle of the machine. Housings are arranged at or near the middle of the machine for the bearings for the inner ends of the rolls and between the housings couplings are employed for connecting together the presented ends of the rolls.

We will further describe the improvements constituting our invention as applied to the rolls of the tin-pot and grease-pot of the continuous machine for which we are applying for a patent by our application Serial No. 184,768 the said tin-pot and grease pot being illustrated in the accompanying drawing.

Fig. 3 is a plan of the grease pot and grease pot rolls and gearing and Fig. 4 is a cross section of the same.

The same letters and numerals of reference indicate the same parts in the several figures of the drawings.

1 is the tin-pot, $1^1$ the soaking pot and $1^2$ the grease pot. $i$, $i^1$, $i^2$ are the rolls by which the plates or sheets are fed or passed to the tin-pot 1. The said rolls $i$, $i^1$, $i^2$ as well as the other rolls hereinafter described are made in two short lengths or halves the presented ends of which are coupled together so as to insure their rotating as one by couplings 2 situated between the middle housings 3, 3 of the rolls. The couplings 2 may be of any construction known or preferred and hence we do not think it necessary further to describe or represent the same.

The rolls $o$, $o$ over the entrance end of the tin pot 1 and the rolls $s$ in the tin-pot 1 are also made in short lengths or halves arranged end to end the inner ends being supported in housings in the tin-pot and being coupled together.

Figure 1:
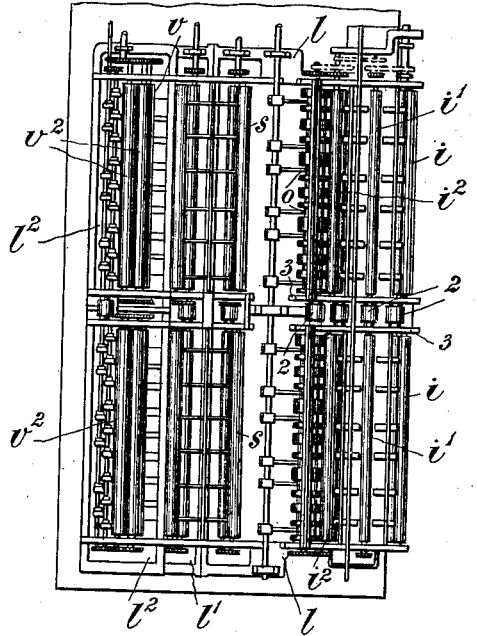
Figure 1 represents a plan of the said tin-pot and grease pot.
Figure 2:
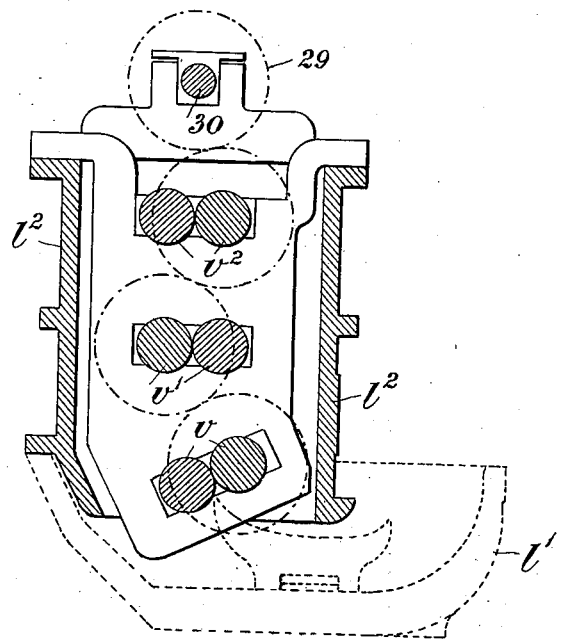
Fig. 2 is a vertical section through the grease pot rolls and gearing for the same.

The rolls $v$, $v^1$, $v^2$ in the grease pot are similarly in two short lengths or parts but independent gearing is provided for the said separate grease pot rolls as is best seen in Figs. 2, 3, and 4.

The gearing for each of the two sets of end to end grease pot rolls $v$, $v^1$, $v^2$ is driven by a spur wheel 29 on a shaft 30 situated over the right hand half of the grease pot $1^2$ as is illustrated in the said Figs. 2, 3 and 4 the additional housings for the presented ends of the rolls $v$, $v^1$, $v^2$ near the middle of the grease pot $1^2$ being spaced apart to an extent sufficient to accommodate the gearing between them.

By the arrangement hereinbefore described the complete stoppage of the machine or apparatus will not result from the fracture or breakage of a roll on one or other side of the machine and one half of the machine may be worked when parts of the other half have been removed to effect repairs or for other purposes.

We claim:—

1. In a tinning machine or apparatus having a width proper to take a series of plates or sheets abreast or side-by-side, the combination of divided rolls arranged end to end or in line, housings supporting the adjacent or presented ends of the rolls, said housings being arranged along or near the middle line of the machine, and driving means for the said divided rolls for insuring their rotation in unison.

2. In a tinning machine or apparatus constructed of a width proper to take a series of plates or sheets abreast or side by side, the employment in the grease pot of the machine of divided rolls arranged end to end or in line, and housings near the middle of the grease pot for supporting the presented ends of the rolls, the two series of end to end rolls being provided with independent gearing, the upper gear wheels of each train of wheels being driven by gear wheels on a common shaft situated over the grease pot.

In testimony whereof we have hereunto set our hands.

HUBERT SPENCE THOMAS.
WILLIAM ROBERT DAVIES.
RICHARD BEAUMONT THOMAS, *deceased*,
By Mrs. CONSTANCE BEAUMONT THOMAS,
HENRY ROBERT WILLIAM ANDERSON,
CHARLES BATHURST,
   *Executors.*